(12) United States Patent
Milstead et al.

(10) Patent No.: US 7,831,543 B2
(45) Date of Patent: Nov. 9, 2010

(54) SYSTEM, METHOD AND COMPUTER-PROGRAM PRODUCT FOR STRUCTURED DATA CAPTURE

(75) Inventors: James M. Milstead, Madison, AL (US); Scott R. Greene, Defiance, MO (US); Renee J. Pankrast, Madison, AL (US); David M. Hester, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 11/264,490

(22) Filed: Oct. 31, 2005

(65) Prior Publication Data
US 2007/0100858 A1    May 3, 2007

(51) Int. Cl.
*G06F 7/00* (2006.01)
(52) U.S. Cl. .............. 707/602; 707/915; 707/917; 707/621; 707/805; 715/205
(58) Field of Classification Search .......... 707/621, 707/601, 603, 805, 915, 917
See application file for complete search history.

(56) References Cited

U.S. PATENT DOCUMENTS

| | | | | |
|---|---|---|---|---|
| 6,834,285 B1* | 12/2004 | Boris et al. | ............. | 707/103 R |
| 7,028,304 B1* | 4/2006 | Weinberger et al. | ......... | 719/310 |
| 7,281,018 B1* | 10/2007 | Begun et al. | ................ | 707/102 |
| 2002/0051262 A1* | 5/2002 | Nuttall et al. | ................ | 358/537 |
| 2002/0123915 A1* | 9/2002 | Denning et al. | ................ | 705/7 |
| 2004/0128613 A1* | 7/2004 | Sinisi | ........................ | 715/500 |
| 2005/0060340 A1* | 3/2005 | Sommerfield et al. | ........ | 707/102 |
| 2005/0125720 A1* | 6/2005 | Little et al. | .................. | 715/513 |
| 2005/0172276 A1* | 8/2005 | Eilebrecht | .................... | 717/143 |
| 2006/0112110 A1* | 5/2006 | Maymir-Ducharme et al. | ........................ | 707/100 |
| 2008/0139907 A1* | 6/2008 | Rao et al. | .................... | 600/323 |

OTHER PUBLICATIONS

Google as archived in wayback machine, Nov. 29, 1999. The URL is http://web.archive.org/web/19991129021746/http://www13.google.com/.*
XML A Primer by Simon St.Laurent. 2nd Ed. Library of Congress. 1999. pp. 45-47, 16-161, 219-223.*
The article "Google Wins PC Magazine's Technical Excellence Award for Innovation in the Web Application Development" by Comdex/Fall '99, Las Vegas Nov. 16, 1999.*

* cited by examiner

*Primary Examiner*—James Trujillo
*Assistant Examiner*—Fatima P Mina
(74) *Attorney, Agent, or Firm*—Yee & Associates, P.C.; Baldwin D. Quan

(57) ABSTRACT

Techniques are provided for capturing data which satisfy data requirements of a particular data capture process. Schema including input requests for the data which satisfy the data requirements of the particular data capture process are specified. The schema can then be transformed into a template which includes the input requests and which conforms to the schema. The template can then be interpreted, and the input requests can be presented to a data provider. Structured data which satisfy the data requirements of the particular data capture process can then be generated based on responses to the input requests.

7 Claims, 13 Drawing Sheets

```
<?xml version="1.0" encoding="UTF-8"?>
<xs:schema elementFormDefault="qualified" attributeFormDefault="unqualified" xmlns:xs="http://www.w3.org/2001/XMLSchema">
<xs:element name="Corrosion">
    <xs:complexType>
        <xs:sequence>
            <xs:element name="CORROSION_SEVERITY" type="xs:string" >
                <xs:simpleType>
                    <xs:restriction base="xs:string">
                        <xs:enumeration value="Light Surface" />
                        <xs:enumeration value="Moderate Surface" />
                        <xs:enumeration value="Heavy Surface" />
                        <xs:enumeration value="Exfoliation" />
                        <xs:enumeration value="Pitting" />
                    </xs:restriction>
                </xs:simpleType>
            </xs:element>
            <xs:element name="CORROSION_LENGTH" type="xs:decimal" />
            <xs:element name="CORROSION_WIDTH" type="xs:decimal" />
        </xs:sequence>
    </xs:complexType>
</xs:element>
</xs:schema>
```

```
<?xml version="1.0" encoding="UTF-8"?>
<Corrosion xmlns:xsi="http://www.w3.org/2001/XMLSchema-instance">
    <CORROSION_SEVERITY>Light Surface</CORROSION_SEVERITY>
    <CORROSION_LENGTH>5</CORROSION_LENGTH>
    <CORROSION_WIDTH>2</CORROSION_WIDTH>
</Corrosion>
```

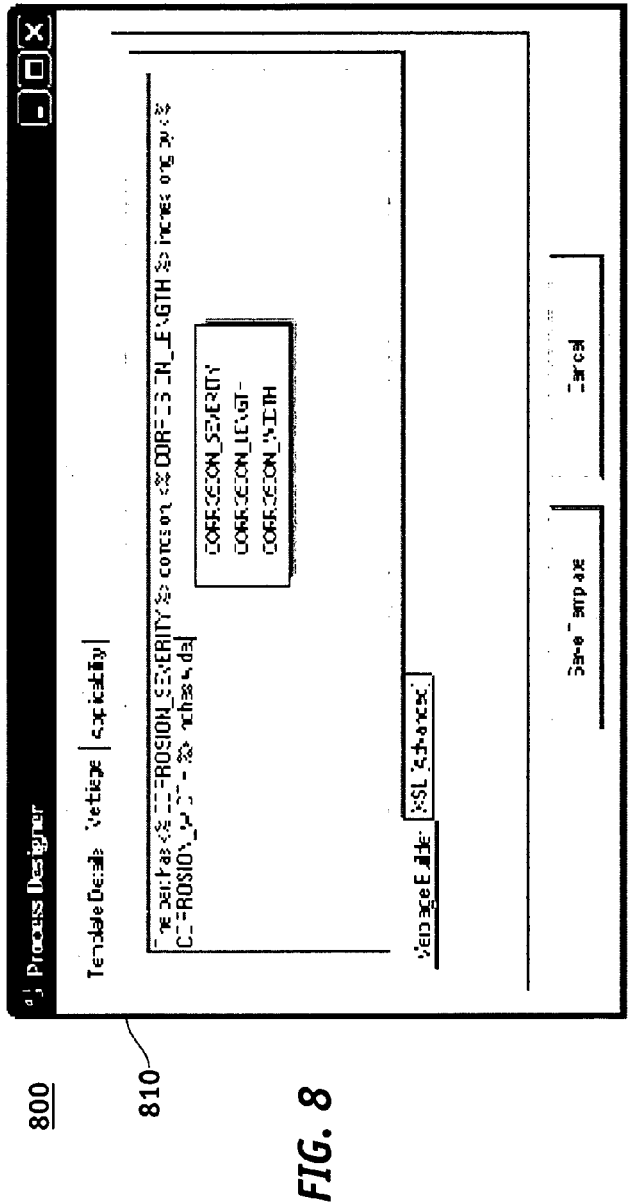

FIG. 8

```
<?xml version="1.0" encoding="UTF-8"?>
<xsl:stylesheet version="1.0" xmlns:xsl="http://www.w3.org/1999/XSL/Transform" xmlns:fo="http://www.w3.org/1999/XSL/Format">
<xsl:output omit-xml-declaration="yes" standalone="yes" indent="no"/>
<xsl:template match="/">
    <xsl:text disable-output-escaping="yes">The part has </xsl:text>
    <xsl:value-of select="CORROSION_SEVERITY"/>
    <xsl:text disable-output-escaping="yes"> corrosion, </xsl:text>
    <xsl:value-of select="CORROSION_LENGTH"/>
    <xsl:text disable-output-escaping="yes"> inches long by </xsl:text>
    <xsl:value-of select="CORROSION_WIDTH"/>
    <xsl:text disable-output-escaping="yes"> inches wide.</xsl:text>
</xsl:template>
</xsl:stylesheet>
```

SYSTEM, METHOD AND COMPUTER-PROGRAM PRODUCT FOR STRUCTURED DATA CAPTURE

TECHNICAL FIELD

The present invention generally relates to information collection in the context of a specific work environment.

BACKGROUND

In certain work environments, a user often serves as a point of integration within a complex analysis project which involves information collection and reporting of the collected information. Conventionally, during an information collection process, a user encounters a situation that includes a large amount of information. The user analyzes the situation and determines which pieces of information are appropriate or relevant to the specific situation (e.g., a specific task in a specific work environment). In other words, the user extracts what they perceive to be the relevant or appropriate information and attempts to minimize any extraneous information. The user locally records this appropriate or relevant information. After a time delay, the user collects and analyzes additional, related enterprise information from other sources which may comprise information or data records relating to the specific situation and/or task the user encounters in a given work environment. These records can also be based on who the specific user is and/or what the specific user is working on. For example, the records might include personal records, statistics, quality records, defect records, status records, timing information, date information, historical information, configuration information, design information, survey information, audit information, inventory information, and identification information. The user then records information he/she deems relevant into the computer. The computer communicates the information to a database which stores this information as a "report." The database can be part of a system sometimes referred to as an information management system (IMS). Of the total information available in a particular situation, only certain "desired" information is relevant or appropriate to resolve that particular situation and should be included in the report. The desired information can include, for example, findings, recommendations or conclusions used to characterize, disposition, resolve or fix a specific, particular situation. However, an ideal report should not include extraneous information that is unnecessary or irrelevant to characterize, disposition, resolve or fix the specific, particular situation. This desired information generated by the user can then be used to help track and understand the information.

One example of an information collection process might take place, for example, in the context of a problem identification and reporting process. In a particular work environment, a user, such as an inspector or other worker, might traditionally encounter a work situation that involves a specific problem. The user typically analyzes the problem and extracts what they believe to be appropriate information to characterize and/or potentially solve the problem. The user typically takes handwritten notes which describe their findings, recommendations or conclusions regarding the problem, and then transfers their notes to a computer system at a later time. In many cases the user's work environment often prevents the user from recording the information in the IMS immediately. Before entering the information into an IMS, many users also need to do subsequent research that is helpful in characterizing the problem or in generating their conclusions. At a later time the user or another person can enter the problem information into a problem management system (PMS) that resides in an IMS.

For example, one industry that has traditionally relied on manual methods of collecting data and recording it for future use is the aircraft manufacturing, modification and maintenance industry. In this work environment, aircraft inspectors would traditionally take handwritten notes of defects or non-conformance problems while inspecting an aircraft and then, at a later time, research fault criteria and part numbers and file a report by manually typing their notes into a problem management system (PMS) maintained on a remote computer in another location.

Such information collection processes are inefficient and can result in duplication of effort since an intermediate step takes place between identifying the problem and entering it into the problem reporting system. As such, these processes can often result in large delays or cycle times which arise during the time elapsed between analyzing and identifying the information, recording the relevant information on paper, and subsequently logging it into the IMS.

Portable personal computers (PCs) and wireless networking technologies have enabled point-of-use information collection technologies. Using the computers to collect information along with wireless networking technologies can allow a user to simultaneously collect and record the collected information in an IMS connected to the network. To make the process of collecting information even more efficient, free-form computer processes can use a simple form to standardize reporting of any information encountered within the specific work environment. Users can be provided with these standard, generalized forms over a user interface on the computer. The users can record information they deem to be appropriate or relevant on a form and then submit the completed form to an IMS.

Standardized forms can often result in incomplete or erroneous recording of the information. These standardized forms do not adapt or correspond to particular situations within a work environment, and are not designed to extract particular "desired" information that might be helpful in resolving the specific situation. In many cases an individual may fail to include some of the "desired" information required in a specific situation.

Standardized forms are also plagued by inconsistent information entry. Information deemed relevant in a particular situation to one user may vary greatly from that deemed relevant by another user. Because the actual description of the information is left up to the individual recording the information into the form, this can result in vast differences with respect to the manner in which information is reported. Free-form text entered by individual users tends to vary depending on the user, time of day, etc. As such, the information that is eventually reported can vary on a case-by-case or user-by-user basis. For instance, when different users record similar information, the particular information they choose to provide or the words they use to describe that information can vary significantly. Moreover, information recorded by a single user can also vary significantly each time that user records the same information since the same user might record the same information differently at different times.

Standardized forms are also susceptible to entry of undesired information and to user errors. For example, users might enter extraneous information that is unnecessary, inappropriate or irrelevant and not useful in the specific, particular situation that exists within the context of the particular work environment.

Another drawback of hard-coded process workflows or input forms is that they can not be re-used for data capture scenarios other than their original design.

Extensible Markup Language (XML), a formal recommendation from the World Wide Web Consortium (W3C), is increasingly becoming a preferred format for transferring data. XML can be used by an entity that wants to share information in a consistent way. XML provides a flexible way to create common information formats and share both the format and the data on the World Wide Web, intranets, and elsewhere. XML is a tag-based hierarchical language that provides the ability to represent data in diverse formats and contexts. XML uses markup symbols to describe the contents of a page or file. XML is "extensible" because the markup symbols are unlimited and self-defining. XML describes the content in terms of what data is being described. XML can be used to represent data spanning the spectrum from semi-structured data (such as one would find in a word-processing document) to generally structured data. An XML file can be processed purely as data by a program, stored with similar data on another computer and/or displayed. XML is well-suited for many types of communication including business-to-business and client-to-server communication.

XML Schema Definition (XSD) specifies how to formally describe the elements in an Extensible Markup Language (XML) document. This description can be used to verify that each item of content in a document adheres to the description of the element in which the content is to be placed. In general, a schema is an abstract representation of an object's characteristics and relationship to other objects. An XML schema is an XML vocabulary for describing XML instance documents. The term "instance" is used because a schema describes a class of documents, of which there can be many different instances. An XML schema represents the interrelationship between the attributes and elements of an XML object (for example, a document or a portion of a document). To create a schema for a document its structure is analyzed and each structural element is defined within a set of tags as it is encountered. A schema definition can be processed with standard XML tools and services such as DOM, SAX, XPath, and XML Transformations (XSLT). Benefits of XSD include self-documentation, automatic schema creation, and the ability to be queried through XML Transformations (XSLT).

Extensible Stylesheet Language (XSL), formerly called Extensible Style Language, is a language for creating a style sheet that describes how data, marked up using the Extensible Markup Language (XML), is to be presented. XSL gives a developer tools to describe exactly which data fields in an XML file to display, and exactly where and how to display them. Like any style sheet language, XSL can be used to create a style definition for one XML document or reused for many other XML documents. Data represented in XML is often created and retained in electronic documents, such as electronic forms. The structure of an electronic form that is written in XML typically is governed by an XML schema (XSD) and this structure can be altered by applying an eXtensible Style-sheet Language Transformation (XSLT) file on the form.

Notwithstanding these advances, there is a need for improved information collection techniques which can help ensure that a user collects all of the relevant or desired information needed to report a particular situation in a specific work environment without collecting extraneous information. These techniques should help ensure that the collected information is reported in a consistent manner regardless of the user. The information reported or recorded should not tend to vary on a case-by-case or user-by-user basis. The recorded information should include all information needed to report a particular situation in the context of that situation. Such techniques should also help to reduce errors in recording of the information, and allow the reported information to be posted quickly into an IMS. Other desirable features and characteristics of the present invention will become apparent from the subsequent detailed description and the appended claims, taken in conjunction with the accompanying drawings and the foregoing technical field and background.

BRIEF SUMMARY

Techniques are provided for capturing data which satisfy data requirements of a particular data capture process. Schema including input requests for the data which satisfy the data requirements of the particular data capture process are specified. The schema can then be transformed into a template which includes the input requests and which conforms to the schema. The template can then be interpreted, and the input requests can be presented to a data provider. Structured data which satisfy the data requirements of the particular data capture process can then be generated based on responses to the input requests.

BRIEF DESCRIPTION OF THE DRAWINGS

The present invention will be described in conjunction with the following drawing figures in which like numerals denote like elements.

FIG. 5 is an example of XML schema (XSD) generated by questions in FIG. 4;

FIG. 8 shows a screen shot of a graphical user interface (GUI) for verbiage editing; and FIG. 9 is an XSL representation of the verbiage specified in FIG. 8 and generated by a "verbiage editor" sub-module;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used exclusively herein to mean "serving as an example, instance, or illustration." Any embodiment described herein as "exemplary" is not necessarily to be construed as preferred or advantageous over other embodiments.

Overview

Techniques are provided for use in an information collection process which can be used to capture data which satisfy data requirements of a particular data capture process. Schema are specified which include input requests for the data which satisfy the data requirements of the particular data capture process are specified. The input requests may comprise, for example, questions to be presented to a data provider who is tasked with collecting the data which satisfy data requirements of a particular data capture process. In one embodiment, the schema can be specified by specifying a step for each input request, and translating the steps into the schema. Each step comprises a variable name by which a response to that step is referenced.

The schema can then be transformed into a template which includes the input requests and which conforms to the schema, such as XML schema. In this case, the XML schema can be transformed into an XML-based template conforming to the XML schema. Standard text to be combined with the responses to the input requests can optionally be specified. The template can then be interpreted, and the input requests can be presented to a data provider. Structured data which satisfy the data requirements of the particular data capture process can then be generated based on responses to the input requests. The input requests comprise questions and the responses comprise responses to the questions. In one implementation, an XML document which comprises the structured data can be generated based on the responses to the questions. The XML document can be generated, for example, by saving the responses to the questions in the XML document as structured XML data which satisfy the data requirements of the particular data capture process and which conform to the XML schema. In addition, external data obtained from an external data provider can be integrated within at least one of the steps to help satisfy the data requirements of the particular data capture process. The XML document can be converted to an unstructured human-readable text format. For example, an eXtensible Stylesheet Language Transformation (XSLT) can be performed on the XML document to generate an XSL document comprising the structured XML data integrated into the standard text.

Exemplary Implementation

Figure 1:
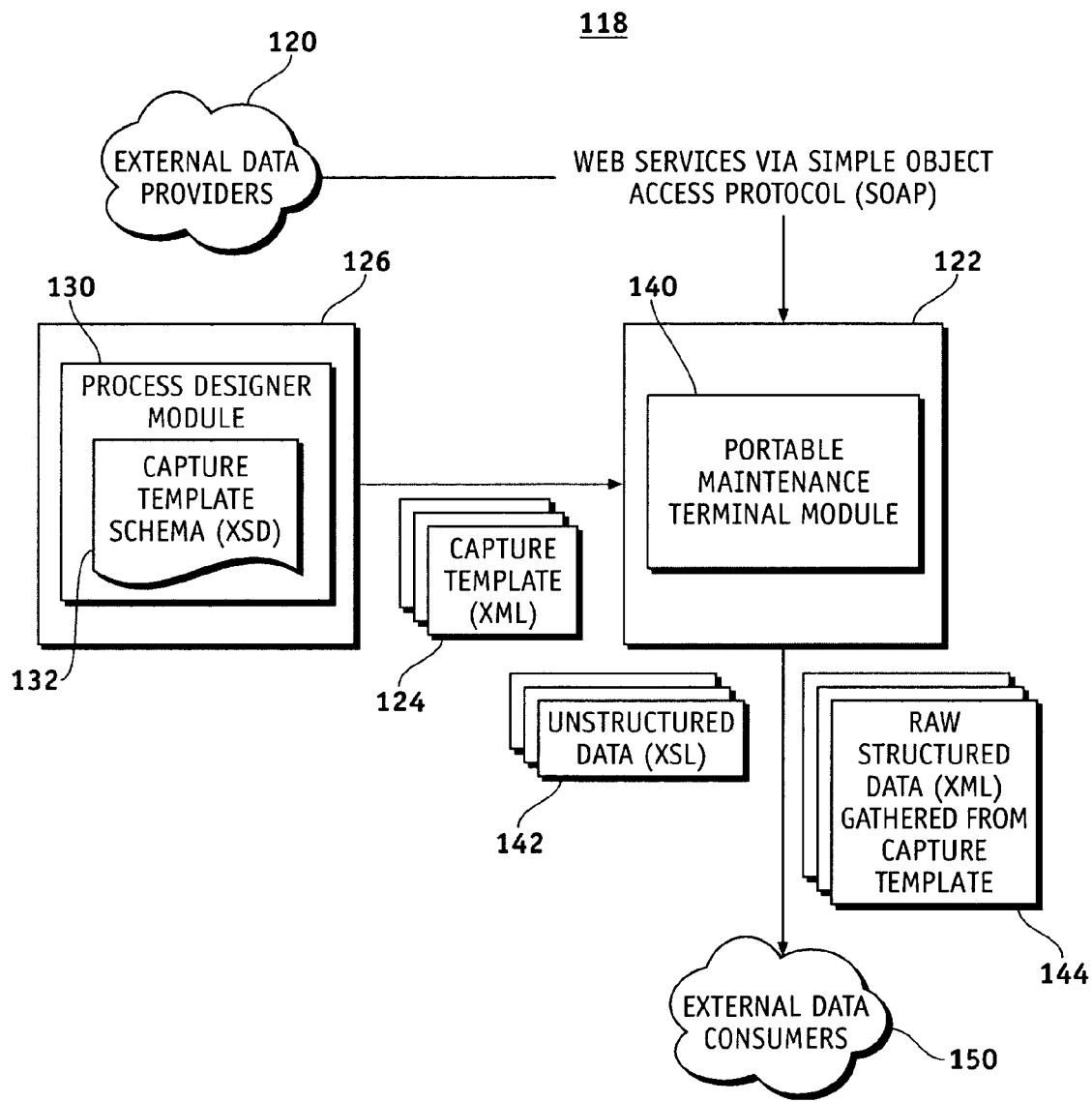
FIG. 1 is a block diagram of an exemplary system for capturing data in a structured, consistent and repeatable manner during an information collection process.

FIG. 1 is a block diagram of an exemplary system 118 for capturing data in a structured, consistent and repeatable manner during an information collection process. The system 118 provides a platform which comprises external data provider(s) (EDPs) 120, a computer 122 including a portable maintenance terminal (PMT) module 140, a computer 126 including Process Designer (PD) module 130 and external data consumers (EDCs) 150. This system 118 provides a platform which can allow for collection desired information within the context of a specific work environment. The system 118 implements efficient process-based methods for improving information collection within the context of a specific information collection process. The data capture capability can be used to quickly and efficiently model work processes and the inputs required of workers to accomplish a given task.

The Process Designer (PD) module 130 is an application that provides a simple mechanism for a process designer to build an Extensible Markup Language (XML) based "capture template" 124 using a graphical user interface (GUI). The application can be implemented, for example, using Microsoft's VisualBasic.NET programming language. Alternatively, other programming languages or libraries, such as Java, could be used to build or implement the system.

Figure 2A:
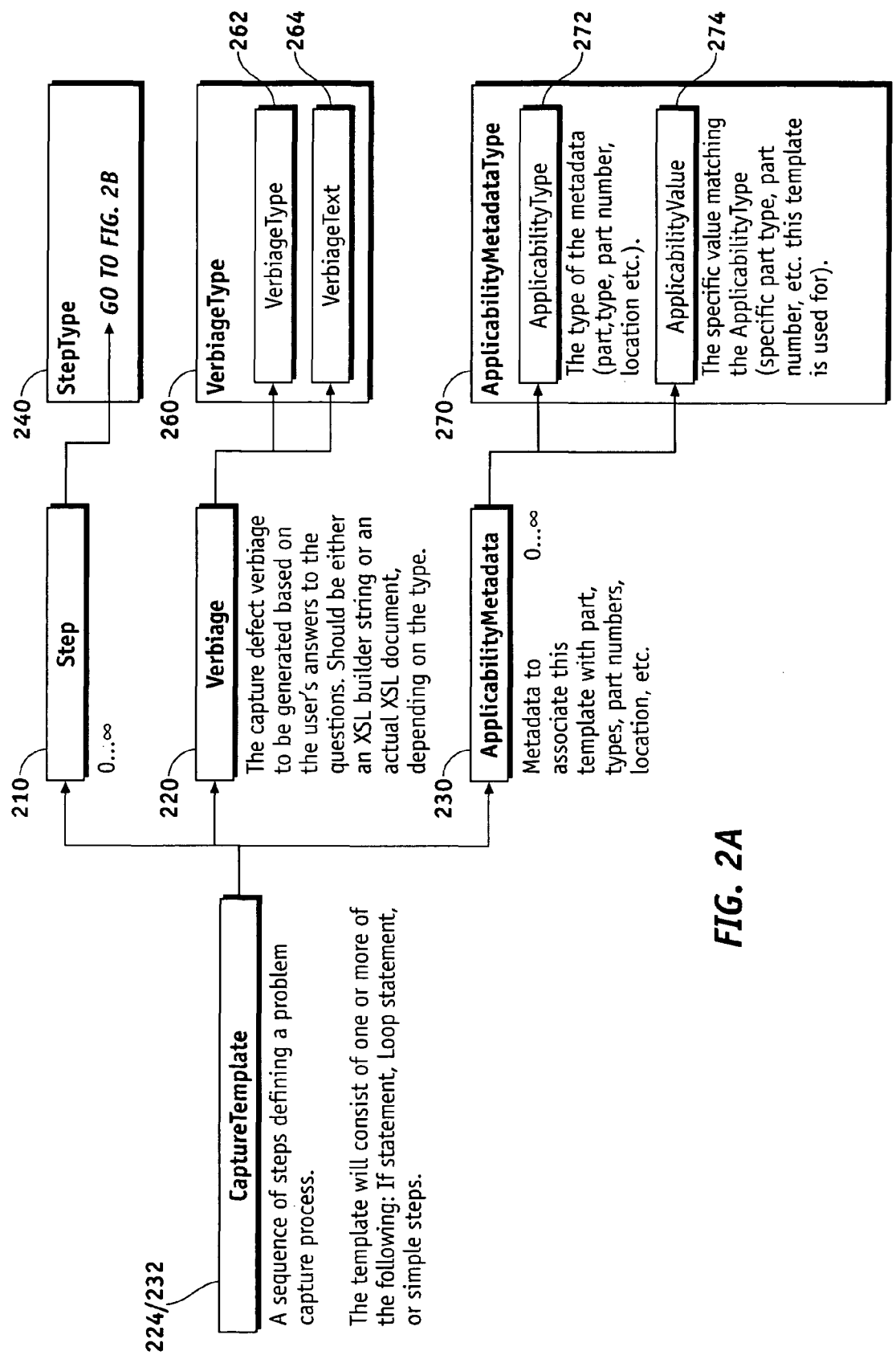
FIG. 2A is a diagram of capture template XML schema according to an embodiment.

A capture template 124 comprises a series of questions to be asked of a data provider or person capturing the data. The PD module 130 builds a capture template 124 by specifying particular inputs a data provider should provide to satisfy the data requirements of a given information collection process. To construct a capture template 124, the process designer builds an XML capture template schema (XSD) 132 that defines the set of questions that can be asked of the data provider or person capturing the data. The XML-based capture template 124 which is eventually generated by the PD module 130 will conform to this XML capture template schema (XSD) 132. FIG. 2A, which will be described in detail below, is a diagram of XML capture template schema (XSD) 132/232 according to an embodiment. The specific capture template 124 designed using the PD module 130 typically differs based on the type of data captured.

The process designer who authors the capture template 124 using the PD module 130 can author the capture template 124 using a graphical user interface (GUI) provided by the PD module 130. This GUI can be similar to interfaces provided by products such as Microsoft Visio or Rational Rose, etc. This GUI allows the process designer to drag, drop, and connect data capture "steps" in a graphical manner. To create steps in the capture template 124, the processor designer gives each step a name, which is treated as a "variable name" by which an eventual response to that step can be referenced. In the background, the defined steps and their names are used to generate (or be translated into) XML capture template schema (XSD) 132. The XML capture template schema (XSD) 132 define an XML document 144 whose contents are the responses of the user answering the questions. This capability hides the user from the XML- and XSL-based inner workings of the application. In one embodiment, once process designer specifies the XML capture template schema (XSD) 132 for describing a particular data capture process, a process designer can model a process, for example, by using an XML or text editor. However, in another embodiment process designers will not be familiar or comfortable with the XML markup language, the PD module 130 is provided with a verbiage editor sub-module (not shown).

Among other characteristics, the PD module 130 is accessible to process designers who are familiar with the data requirements needed to satisfy the data requirements of a given information collection process, but who may not posses programming skills. To avoid the skill needed to author XSL, the PD module 130 application includes a "verbiage editor" sub-module. The verbiage editor sub-module can allow the process designer to specify verbiage or "standard text" which can be combined with XML data (e.g., the data provider's structured responses 144) to eventually yield a document 142 which presents the data in an unstructured, human-readable format. In one implementation, the verbiage editor sub-module allows the process designer to specify how standard text and responses of a data provider should be combined. The process designer who authors the capture template 124 can select from the available question responses, for instance, by right-clicking and selecting them from a context menu. The PD module 130 application then automatically generates or converts the verbiage into an XSL document 142.

The PD module 130 also comprises an interface which allows the capture template 124 to connect to external data providers (EDPs) 120. The XML capture template schema (XSD) 132 also supports the association of one or more web services with each of those data capture steps. The PMT module 140 can use the web service of external data providers 120 to integrate external data within the process. The EDPs 120 can provide external data to the process designer that may assist the data provider in providing the data required to complete the information collection process. In the implementation shown in FIG. 1, for example, the EDPs 120 provide web services to the PMT module 140 via a protocol, such as, a Simple Object Access Protocol (SOAP). Examples of web services provided by the EDP 120 can include, for example, inventory lists, lists of products, part numbers on products or parts of products, drawings of products or parts of products, common defects occurring in or complaints about the products or parts of products, etc.

The PMT module 140 application can be implemented in conjunction with any type of portable personal computer (PC) 122 such as a tablet PC, a wireless handset, a personal digital assistant (PDA) or other types of mobile personal computers that can be used at different points-of-use within the specific work environment. The computing device 122 may or may not be mobile and is preferably capable of communicating wirelessly within wireless networks and/or over wired networks. In addition, a non-networked mobile device may also be used to accept template questions and collect data; the non-networked mobile device can then be physically transported to download the collected data to a computer (e.g., a PC) using, for example, firewire or memory cards. For example, a PDA device such as a palm pilot could be used as the data collection device and then it could later be synched to a computer. In one embodiment, the PMT module 140 can be implemented on a wireless-enabled handheld mobile computer 122. The PMT module 140 application can be implemented, for example, using Microsoft's VisualBasic.NET programming language. Microsoft XML processing libraries, provided as part of the Microsoft NET framework, can be used to handle conversion of XML to human-readable text using XSL. XML and XSL are standard markup languages whose specification is managed by the W3C consortium. Alternatively, other programming languages or libraries, such as Java, could be used to build or implement the system.

The PMT module 140 interfaces with the PD module 130. The computer or device 122 in which the PMT module 140 is implemented can include, for example, a transceiver, a user interface, and a processor to facilitate communication with the PD module 130 via a hard-wired network or over the air via a wireless link provided as part of a wireless network. The wireless network can be, for example, a Local Area Network (LAN), a Wireless Area Network (WAN), a Wireless Local Area Network (WLAN) or similar wireless communication system such as a high data rate cellular system, such as CDMA, GSM, or WCDMA based cellular systems, or a WiMAX system. In addition, a non-networked mobile device may also be used to accept template questions and collect data; the non-networked mobile device can then be physically transported to download the collected data to a computer (e.g., a PC) using, for example, firewire or memory cards. For example, a PDA device such as a palm pilot could be used as the data collection device and then it could later be synched to a computer.

The computer 122 running the PMT module 140 application can send requests to the PD module 130 to send the XML-based data capture templates 124 to the computer 122. In response, the computer 122 running the PMT module 140 application receives a given XML-based data capture template 124 from the PD module 130. The capture template 124 is designed to gather specific inputs from a data provider, and yield a structured XML document 144 which satisfies data input requirements of a given information collection process.

The PMT module 140 application interprets the XML-based data capture templates 124 and presents the questions specified by the capture template 124 to a data provider. In one implementation, the PMT module 140 client presents the questions to the data provider utilizing a "wizard-style" step-by-step interface. The PMT module 140 also supports additional user input types (e.g., GPS to determine user location, RFID reader to read information about a part of product, oscilloscope or other sensor to capture real-time status of a part or product) in addition to the graphical user interface (GUI) for displaying the specific questions specified by the XML-based data capture template 124 to the data provider. The data provider (or person capturing the data) provides responses, as prompted, to each of the specific questions specified by the XML-based data capture template 124. The PMT module 140 may also interface with EDPs 120. The PMT module 140 can communicate with computer 126 and the EDPs 120 via a hard-wired network or over the air via a wireless link provided as part of a wireless network. For example, in one implementation, the PMT module 140 receives a web service or services from EDP(s) 120 via a protocol, such as, a Simple Object Access Protocol (SOAP).

Using the XML-based data capture templates 124 (and optionally the web service(s)), the data provider inputs data (e.g., responses to the questions specified by the given XML-based data capture template 124) into the particular XML-based data capture templates 124. The data provider's responses can then be saved into an XML document 144 as raw structured data conforming to (or matching) the XML capture template schema (XSD) 132. Each time a different data provider inputs data into the XML-based data capture templates 124, the resulting XML representation 144 of the data provider's responses is the same since each conforms to the same XML capture template schema (XSD) 132.

While the XML representation 144 of the data provider's responses (saved as an XML document) is excellent for computer analysis, a human readable form of the XML document 142 is also desirable for presentation the data provider or to EDCs 150 who might need to act on the data. To this end, the PMT module 140 also implements an extensible Stylesheet Language (XSL) module (not shown) for processing and altering the XML document 144 to generate an unstructured data (in human readable text form) 142 based on the XML document 142 (such as plain text, Hypertext Markup Language, or XML conforming to a different schema). In other words, the XML document 144 (and its structured XML data 144 gathered by the capture template) can be presented in an unstructured, human-readable form 142. For instance, in one implementation, an eXtensible Stylesheet Language Transformation (XSLT) can be executed on the structured machine readable (XML) data of the XML document 144 to generate an unstructured, human readable text representation 142 of the XML document 144.

As described in co-pending U.S. patent application Ser. No. 11/194,018, filed on Jul. 29, 2005 and titled "SYSTEM, METHOD AND COMPUTER-PROGRAM PRODUCT FOR ALLOWING AN ENTITY TO CAPTURE, INTEGRATE, AND REPORT DESIRED INFORMATION RELATING TO A SPECIFIC SITUATION IN A GIVEN PROCESS-RELATED WORK ENVIRONMENT," which is hereby incorporated by reference herein in its entirety, the EDCs 150 may be part of an information management system. The EDCs 150 are configured to communicate with the portable maintenance terminal 140 over a wired or wireless link. The PMT module 140 provides the machine-readable structured (XML) data 144 to the EDCs 150, and can also provide an unstructured, human-readable text representation (XSL) 142 of the XML data 144. In cases where a non-networked mobile device is used to collect data; the non-networked mobile device can then be physically transported to download the collected data to a computer (e.g., a PC) using, for example, firewire or memory cards. Once synchronization takes place, the computer can then generate the unstructured, human-readable text representation (XSL) 142 of the XML data 144. The EDCs 150 are configured to use the human-readable text representation (XSL) 142 of the structured XML data 144 and the structured XML data 144 for a variety of purposes, some of which are described herein.

FIG. 2A is a diagram of capture template XML schema according to an embodiment. The logical blocks used to build an XML schema for creating a capture template can include, for example, a capture template module 232 which includes a step builder module 210, a verbiage builder module 220 and a metadata applicability indicator module 230.

The step builder module 210 which can be used to create the actual questions to ask the data provider or person capturing the data. The step builder module 210 includes a step type module 240. One exemplary embodiment of a step type module 240 is shown in FIG. 2B which will be described in detail below.

The verbiage builder module 220 which can be used to provide a textual representation of the questions to be displayed and the answers provided by the data provider which in turn forms the basis of the final data document. The verbiage builder module 220 is coupled to a verbiage type block 260 which includes a verbiage type module 262 and a verbiage text module 264. The verbiage type module 262 can be used to specify whether the XSL (which will perform the transformation of the XML data 144 to unstructured text 142) has been generated by the system verbiage builder module 220 or by the user manually. In this manner, the system provides flexibility for the verbiage author to leverage the full power of the XSL language if he/she so chooses. The verbiage text module 264 is the actual XSL document which performs the transformation of XML data 144 to unstructured text 142. The verbiage builder module 220 can be used to specify verbiage to be generated based on the data provider's answers to the questions specified by the data capture template 124. Depending on the type of the verbiage type 262, the input to the verbiage text module 264 can either be a system generated or manually coded XSL document.

The metadata applicability indicator module 230 which can be used to indicate or specify metadata to be associated with the capture template. The applicability metadata module 230 is coupled to an applicability metadata type block 270 which includes an applicability type module 272 and an applicability value module 274. The applicability type module 272 can be used to specify the type of metadata. The applicability value module 274 can be used to specify the specific value matching the applicability type the capture template is used for. The template metadata can be used to assign name/value pairs to data capture templates 124 which can be used for any ad-hoc process. In this manner, the capture template 124 is extensible.

Figure 2B:
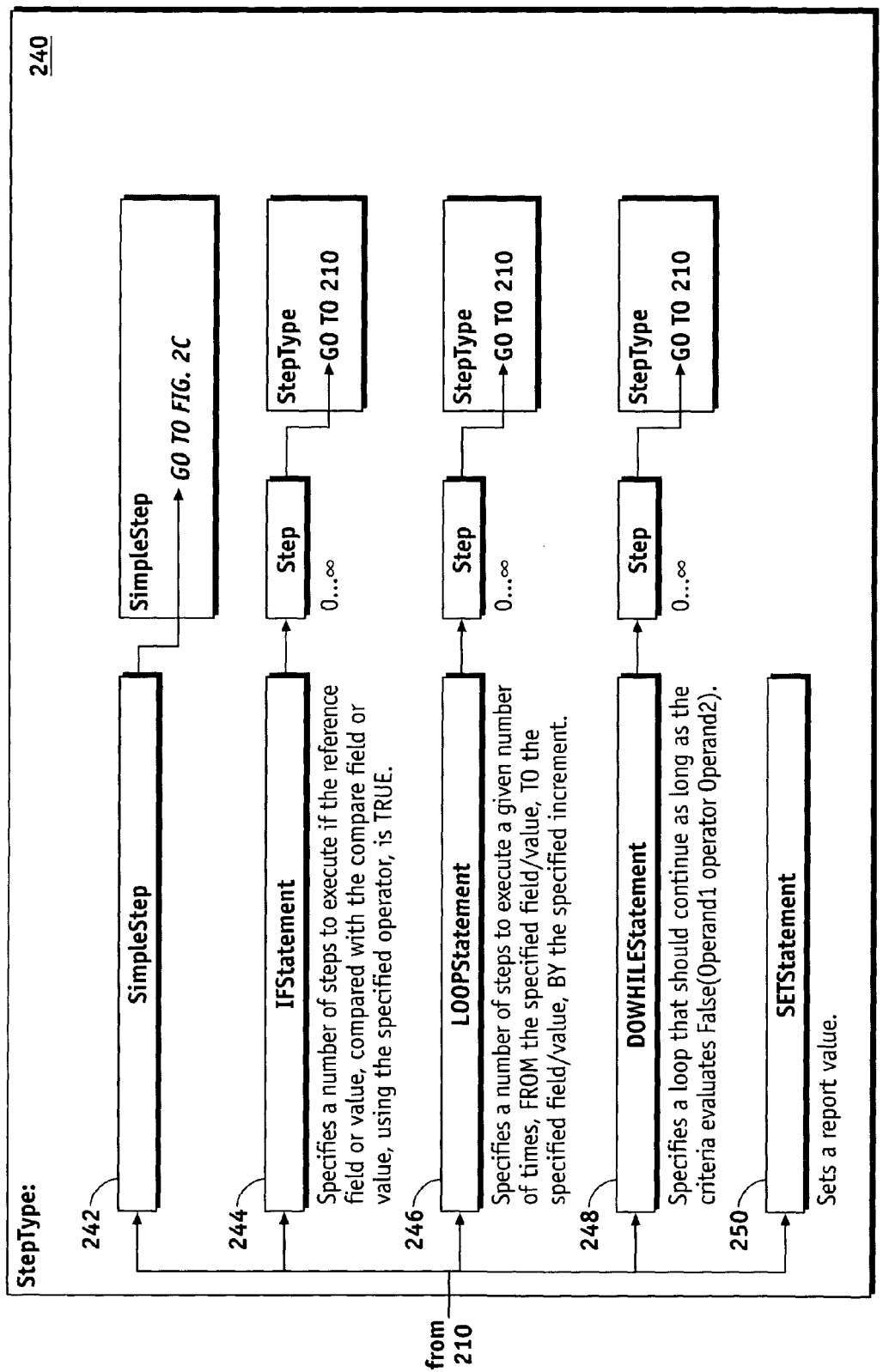
FIG. 2B is a diagram of a step type module for specifying steps in the capture template XML schema according to an embodiment.

FIG. 2B is a diagram of capture template XML schema for a step type step 240 for specifying steps according to an embodiment. The logical blocks used to build capture template schema for an XML step type for creating steps in the capture template include a simple step specification step 242, a IF statement step 244, a LOOP statement step 246, a DO WHILE statement step 248 and a SET statement step 250.

The simple step specification step 242 is used to specify a simple step and is discuss in detail below with reference to FIGS. 2C and 2D. The capture template can handle a wide variety of data capture scenarios including conditional branches ("IF statements"), looping ("FOR . . . LOOP statements"), and sub-processes. Looping and flow-control capabilities built into the PD module 130 can allow a process designer of a capture template to handle a broad variety of data capture scenarios. Thus, in addition to the input types described above, the process designer may use simple logic and flow control operations.

For example, the IF statement step 244 can be used by the process designer to specify a number of steps to execute if the reference field or value, compared with the compare field or value, using the specified operator, is TRUE. The process designer can use an IF Statement to specify questions to ask if a certain logical comparison (also provided by the process designer) evaluates to true.

The LOOP statement step 246 can be used by the process designer to specify a number of steps to execute a given number of times, FROM the specified field/value, TO the specified field/value, BY the specified increment. The process designer can use a LOOP Statement to specify a set of questions to ask a certain number of times. The number of "loops" can be specified either by a hard-coded value or can be controlled by an earlier response.

The DO WHILE statement step 248 can be used by the process designer to specify a loop that should continue as long as the criteria evaluates False (Operand1 operator Operand2).

The SET statement step 250 can be used by the process designer to specify a value directly within the capture template that can be used later to control some aspect of the capture template's flow or output.

Figure 2C:
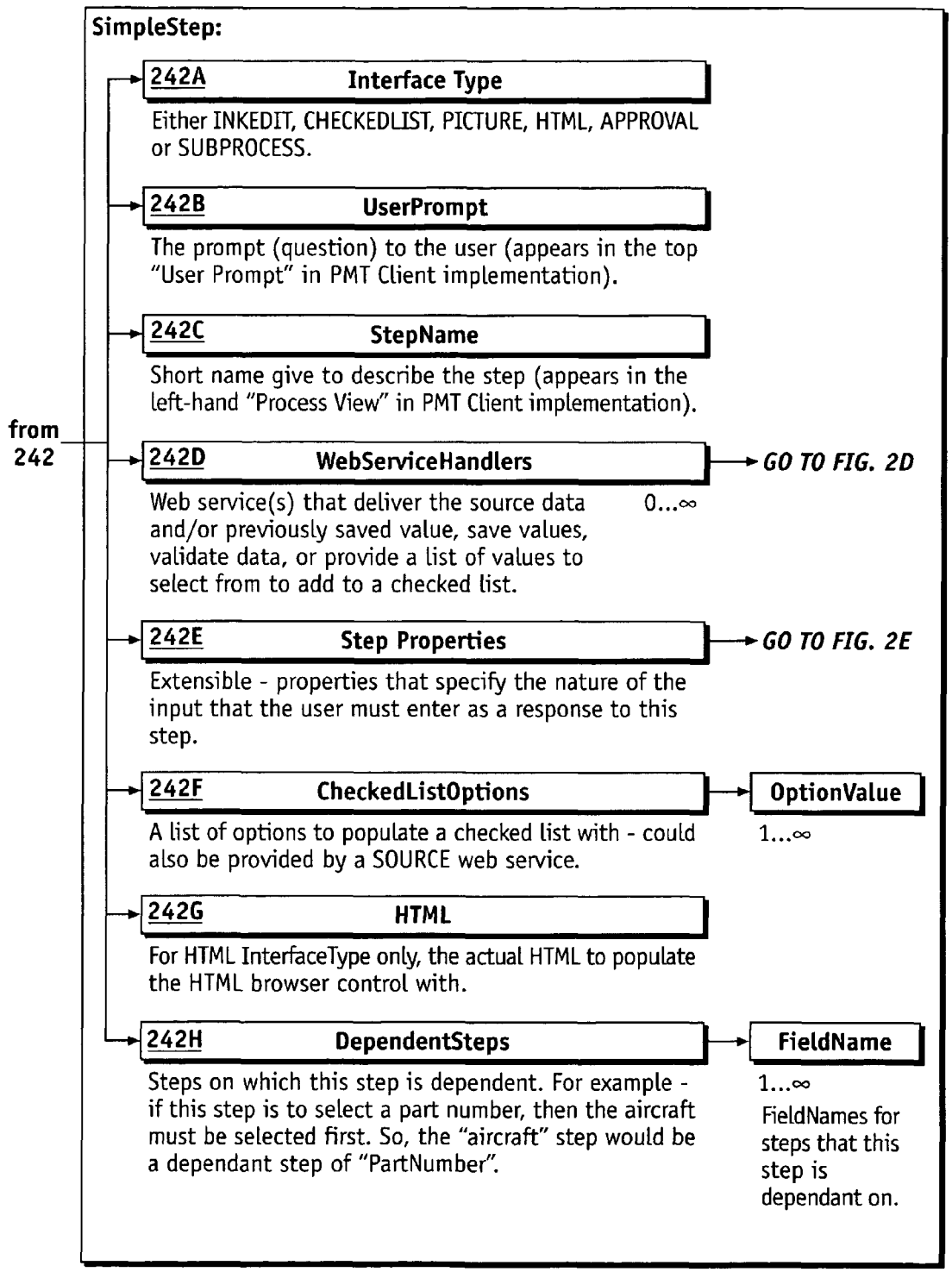
FIG. 2C is a diagram of simple step specification module for specifying simple steps in the capture template XML schema according to an embodiment.

FIG. 2C is a diagram of capture template XML schema for a simple step specification step 242 for specifying simple steps according to an exemplary embodiment. The logical blocks used to build an XML schema for the simple step specification step 242 include an interface type step 242A, a user prompt step 242B, a step name step 242C, a web service handler step 242D, a step properties step 242E, a checked list options step 242F, a HTML interface type step 242G, and a dependent steps specification step 242H.

The interface type step 242A is used to specify the input or interface type which can be, for example, either INKEDIT, CHECKEDLIST, PICTURE, HTML, APPROVAL or SUB-PROCESS. It should be appreciated that this list of input or interface types is not exhaustive and can include additional input types as needed, such as the GPS reader, oscilloscope reader, or other input methods such as those described above. The INKEDIT input type can be used to allow a data provider to write his/her response using handwriting recognition. The CHECKEDLIST input type can be used to allow a data provider to select from a list of available options displayed on the GUI. The INKPICTURE input type can be used to allow a data provider to attach and optionally annotate a graphic image. The APPROVAL input type can be used to allow a data provider to approve some operation using a supported approval method (which could be scanning his/her employee badge, providing a biometric sample, or entering a password).

The user prompt step 242B is used to present a prompt (e.g., question) to the data provider which is typically an instruction telling the data provider what information is required. The step name step 242C is used to specify a short name to describe the step. The web service handler step 242D specifies web service(s) that deliver the source data and/or previously saved values, saved values, validate data or provide a list of values to select from to add to a checked list. The web service handler step 242D is coupled to a web service handler type block 242D1 which includes a number of sub-modules as shown in FIG. 2D.

Figure 2D:
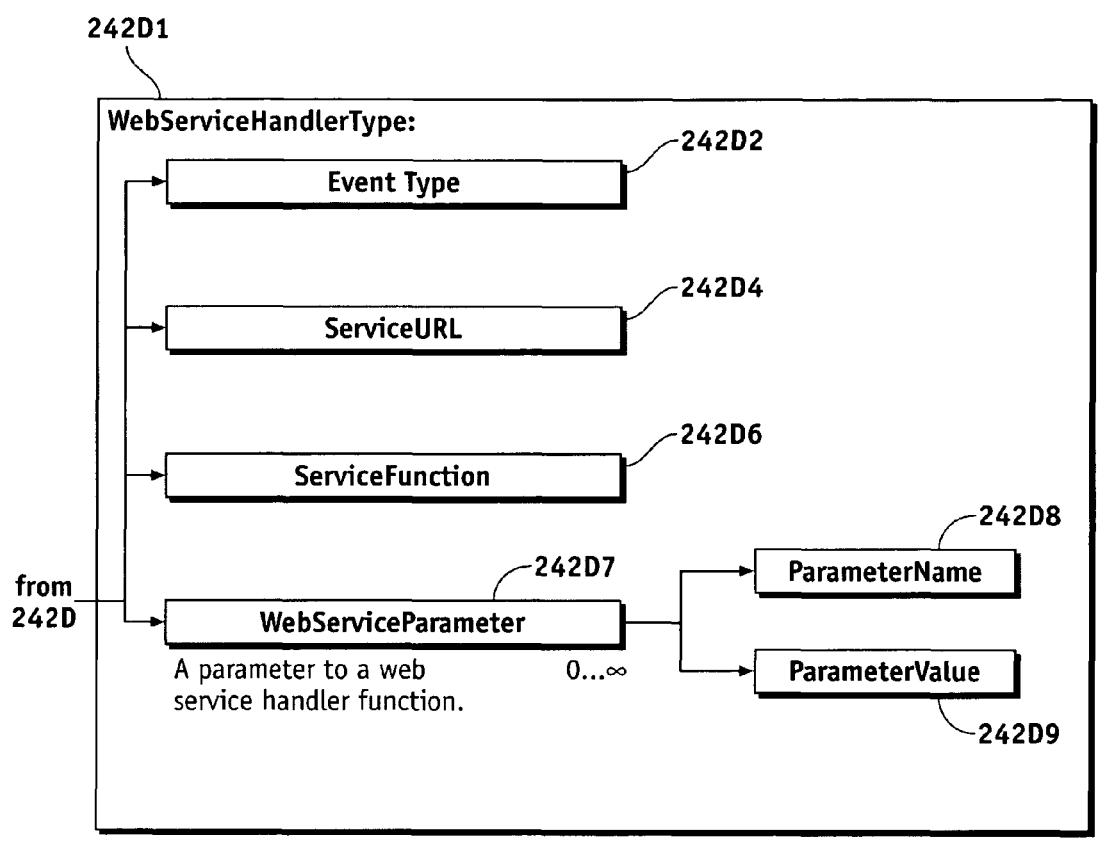
FIG. 2D is a diagram of a web service handler module and its sub-modules for specifying web services in the capture template XML schema according to an embodiment.

FIG. 2D is a diagram of capture template XML schema for a web service handler step 242D1 and its sub-steps 242D2, 242D4, 242D6, 242D7, 242D8 242D9 for specifying web services according to an embodiment. The sub-modules can include, for example, a web service handler event type sub-step 242D2, a web service handler service URL sub-step 242D4, a web service handler service function sub-step 242D6, a web service parameter sub-step 242D7, a web service parameter name sub-step 242D8 and a web service parameter value sub-step 242D9. The web service handler event type sub-step 242D2 specifies the interface the handler will provide. For example, the "SOURCE" interface can provide data to populate the user input control. A "SUBMIT" interface can handle saving the user's input on the specific control. A "VALIDATE" interface can validate whether or not the user's inputs match the range of valid values. The web service handler service URL sub-step 242D4 specifies a uniform resource identifier for an executable module which provides the given interface. This could be a module located on the local machine (such as a dynamic linked library (DLL)) invoked through some sort of inter-process communication, or a module located on another machine (such as a web service) invoked via some remote procedure call interface, such as the Simple Object Access Protocol (SOAP). The web service handler service function sub-step 242D6 specifies the actual function to call provided by the module in 242D4. The web service parameter sub-step 242D7 specifies zero or more parameters to the function at web service parameter sub-step 242D7 including a parameter name sub-step 242D8 and a parameter value sub-step 242D9.

The step properties step 242E allows for specification of a number of extensible properties which specify the nature of the input that the user must enter as a response to this step. An exemplary implementation of the capture template XML schema for step properties step 242E will be described in detail below in FIG. 2E.

The checked list options step 242F is used to specify a list of options to populate a checked list with. This could also be provided by a source web service.

Figure 2E:
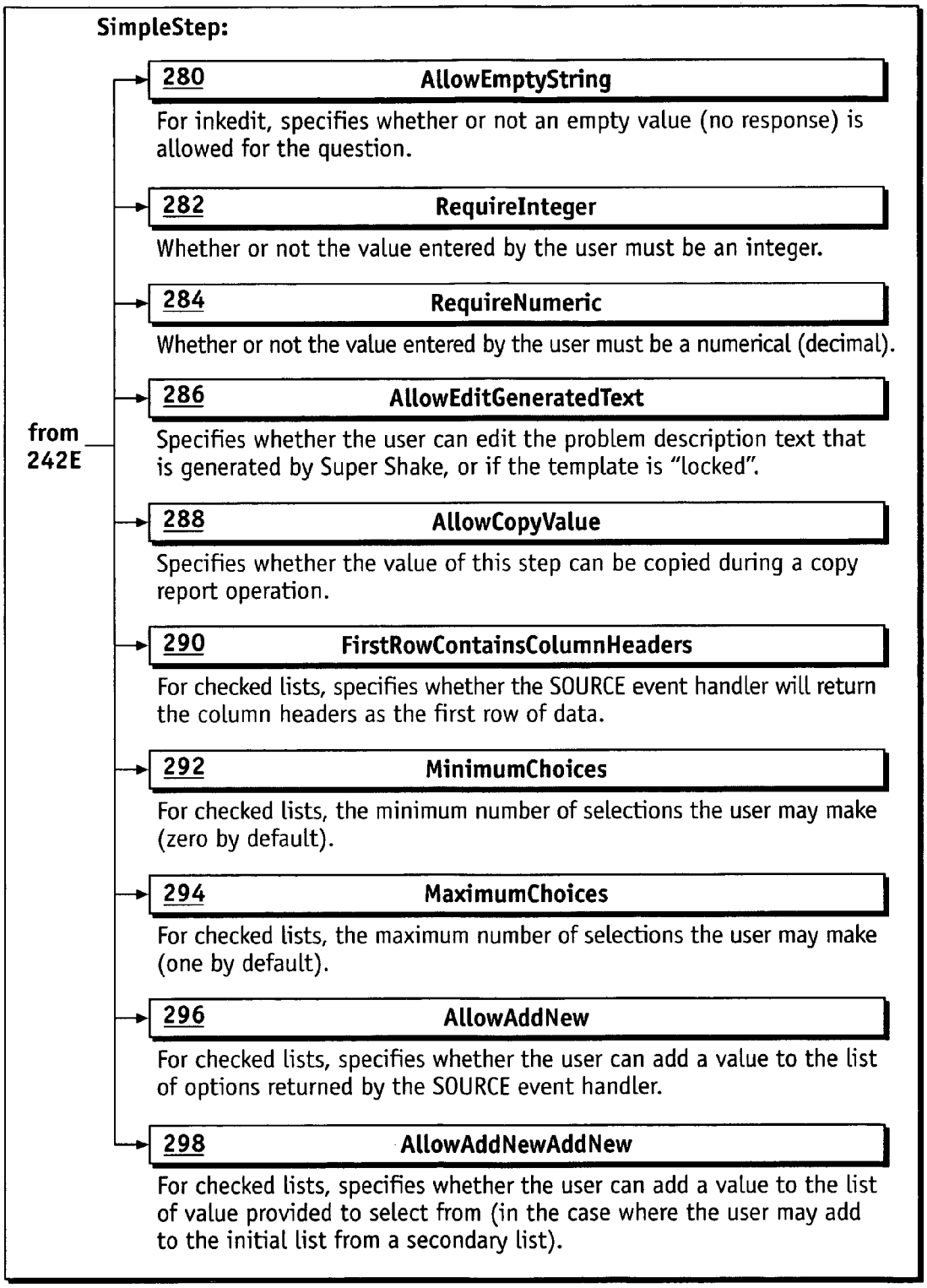
FIG. 2E is a diagram of simple step properties specification module for specifying properties simple steps in the capture template XML schema according to an exemplary embodiment.

FIG. 2E is a diagram of capture template XML schema for a simple step properties specification step 242E for specifying properties of simple steps according to an exemplary embodiment. For example, the step properties step 242E includes a number of sub-modules including an allow empty string sub-module 280, a require integer sub-module 282, a require numeric sub-module 284, an allow editing sub-module 286, an allow copy sub-module 288, a first row sub-module 290, a minimum choices sub-module 292, a maximum choices sub-module 294, an allow new additions sub-module 296, and an add new additions sub-module 298. The allow empty string sub-module 280 can be used for the inkedit option to specify whether or not an empty value (no response) is allowed for the question. The require integer sub-module 282 specifies whether or not the value entered by the data provider must be an integer. The require numeric sub-module 284 specifies whether or not the value entered by the data provider must be a numeric (e.g., a decimal). The allow editing sub-module 286 specifies whether the data provider can edit the problem description text or if the template is "locked" and can not be edited. The allow copy value sub-module 288 specifies whether the value of this step can be copied during a copy report operation. For checked lists, the first row sub-module 290 specifies whether the source event handler will return the column headers as the first row of data. For checked lists, the minimum choices sub-module 292 specifies the minimum number of selections the user may make (zero by default). For checked lists, the maximum choices sub-module 294 specifies the maximum number of selections the user may make (one by default). For checked lists, the allow new additions sub-module 296 specifies whether the user can add a value to the list of options returned by the source event handler. For checked lists, the add new additions sub-module 298 specifies whether the user can add a value to the list of value provided to select from (in the case where the user may add to the initial list from a secondary list).

The HTML interface type step 242G is for use with an HTML InterfaceType and can be used to specify the actual HTML to populate the HTML browser control with.

The dependent steps specification step 242H is used to specify steps on which this step is dependent. It includes a field names sub-module for entering steps that this step is dependent on. For example, if this step is to select a part number, then the aircraft must be selected first. So, the "aircraft" step would be a dependant step of "PartNumber."

Thus, aspects of this embodiment can leverage XML and related technologies in a generic data capture system for capturing data in a structured format. The generic data capture system utilizes customized data "capture templates" at a portable maintenance terminal. An XML-based framework (schema) is provided for implementing a data capture process which yields a structured document. The structured document can then be converted into a human-readable form utilizing an Extensible Stylesheet Language Transformation (XSLT). The structured document can also be analyzed by computers using standard libraries (XML document object model). The use of XML makes the system extremely generic and re-usable, so that the platform that can be re-used in a variety of scenarios. Some of the benefits associated with such generic data capture systems include, for example, knowledge capture, the ability to reuse the captured data, reduced training costs, time savings and consistency of captured data.

The process designer can capture or document their knowledge (e.g., the steps required to document certain situations) into templates that lesser experienced personnel can use (or reuse) to perform their jobs. The "Process Designer" tool makes development of the capture templates accessible to non-programmers. The standard capture templates support standard business processes. As such, employees moving among different business units or programs do not need to be re-trained on specific methods thereby reducing training costs.

Such generic data capture systems can save time since a data provider is relieved of writing the "filler text" required to document a given data capture scenario. Rather, the data provider simply provides "variable" entries of data or text. In one implementation, XSL combines those variable entries with standard text provided by a process designer to produce a document in a final human-readable format. Additionally, common data capture scenarios can be streamlined to be extremely efficient.

This generic data capture system can provide or yield structured data that is consistent. In most cases the documentation is done the same way each time. Because the captured data can be "structured," for example as an XML document, the captured data can be automatically processed by computer programs. In other words, a structured XML document is programmatically "mine-able." This property can allow an entity to perform detailed analysis on the aggregate or total data captured. For instance, statistics can be gathered or analysis can be performed on the total data captured. This supports the development of standard analysis tools across business units or programs (or even across companies if templates are standardized). In some cases, it can automate subsequent action to be taken after the data is captured in a structured form.

Example

Aerospace Maintenance Application

FIGS. 3-9 illustrate how the system described above could be applied in one exemplary implementation in one specific type of business. In this specific implementation, the system described above is applied in the context of an aerospace support business which provides support and maintenance services for aircraft. In this example, the aerospace support business provides support and maintenance services for aircraft. The aerospace support business generates hundreds of nonconformance documents, or "problem reports," every day for various aircraft maintenance and support programs. It should be appreciated that the appended claims should not be construed as being limited by this embodiment in any way; rather the exemplary implementation is provided only as one example of how aspects of the invention could be applied to a specific scenario in a specific business environment. Thus, although this following description applies the invention to capturing problem documentation on aircraft, it should be appreciated that the present invention could easily be adapted to other data capture scenarios, such as, real estate appraisals, banking applications, e-commerce ordering, personal preference profiles, purchase orders, litigation documents, part lists, police reports, inventory recording, doctor's notes from patient visits, audits and other applications where a structured data capture capability would be useful. This is only a partial list and many other applications of this technology are possible.

Conventionally, mechanics and inspectors identifying problems or "nonconformances" would document them by providing a free-form textual description. For example, a mechanic might identify a "defect code" (which is different among the various aircraft programs) and then write out a textual description of the problem. There are several problems with this approach.

For example, this approach tends to be extremely inconsistent since the same person may write up the same problem differently every time, and different people will almost certainly write up the same problem differently. For example, the actual description of the problem is written differently depending on the individual writing the description or even the day of the week (same person will document the same problem differently).

Moreover, there is no standard format. For instance, one inspector might use the "designator for inches, while another writes out "inches", while yet another abbreviates using "in.", and while still another leaves off the unit of measure indicator completely. Another problem is that this process wastes a significant amount of time. For instance, an inspector or mechanic spends time writing up the same problem descriptions over and over again. Worse yet, they might spend time writing a problem report that is rejected by the problem disposition personnel because it fails to include required details.

In addition, it is not easy for inspectors to easily transition if they move from one program to another since they must learn the reporting processes of the new program, which will be different from their current program.

This inconsistency contributes to rejected reports and a less automated report disposition process, which in turn increases the overall cycle time of maintaining the aircraft (a major cost driver). In addition, given that the problem description is written without any enforced structure, it is virtually impossible to do any detailed analysis or processing on the aggregate total of reports without resorting to error-prone parsing of ad-hoc text.

Accordingly, there is a need for standardizing the reporting of quality defects.

Specific Example

One highly specific example of a nonconformance report which might be generated in such an aerospace support business will now be provided. In this example, the nonconformance report relates to documenting corrosion on an aileron part of an aircraft. The aileron has the following points of reference: an upper mold line (UML), a lower mold line (LML), an aft edge, an inboard edge, a leading edge, and a trailing edge. In this example, it is assumed that a data provider, such as a mechanic or an inspector, has observed that the aileron has corrosion in a number of locations. For example, the aileron has severe corrosion, measuring 3 inches by 6 inches, in area which is located 2 inches from a leading edge of the UML. The aileron also has severe corrosion, measuring 4"×9", along a trailing edge on the LML. The aileron also has severe surface corrosion on the UML, measuring 2.1 inches long by 4.3 inches wide, and is centered at a location 4.5 inches from the aft edge and 45.0 from the inboard edge.

It would be helpful if the aerospace support business had a defect map characterizing these instances of corrosion since the designers of the aileron could use the information to determine if there is some aspect of the design of the aileron that contributes to corrosion in certain areas. Although a defect map could be created by a human reading the nonconformance descriptions recorded by mechanics, it would be difficult for a human to write a computer program to build the defect map since a computer program would need this data in a standard format to build the defect map.

In the following example, aspects of the invention can be used to identify problems with aircraft via a standardized nonconformance documentation process. Consistent with the embodiments of the invention described above, an XML-based framework (schema) is provided for implementing a standardized defect capture process which yields a structured document which can then be converted into a human-readable form utilizing the Extensible Stylesheet Language (XSL) and analyzed by computers using standard libraries (XML document object model).

Figure 3:
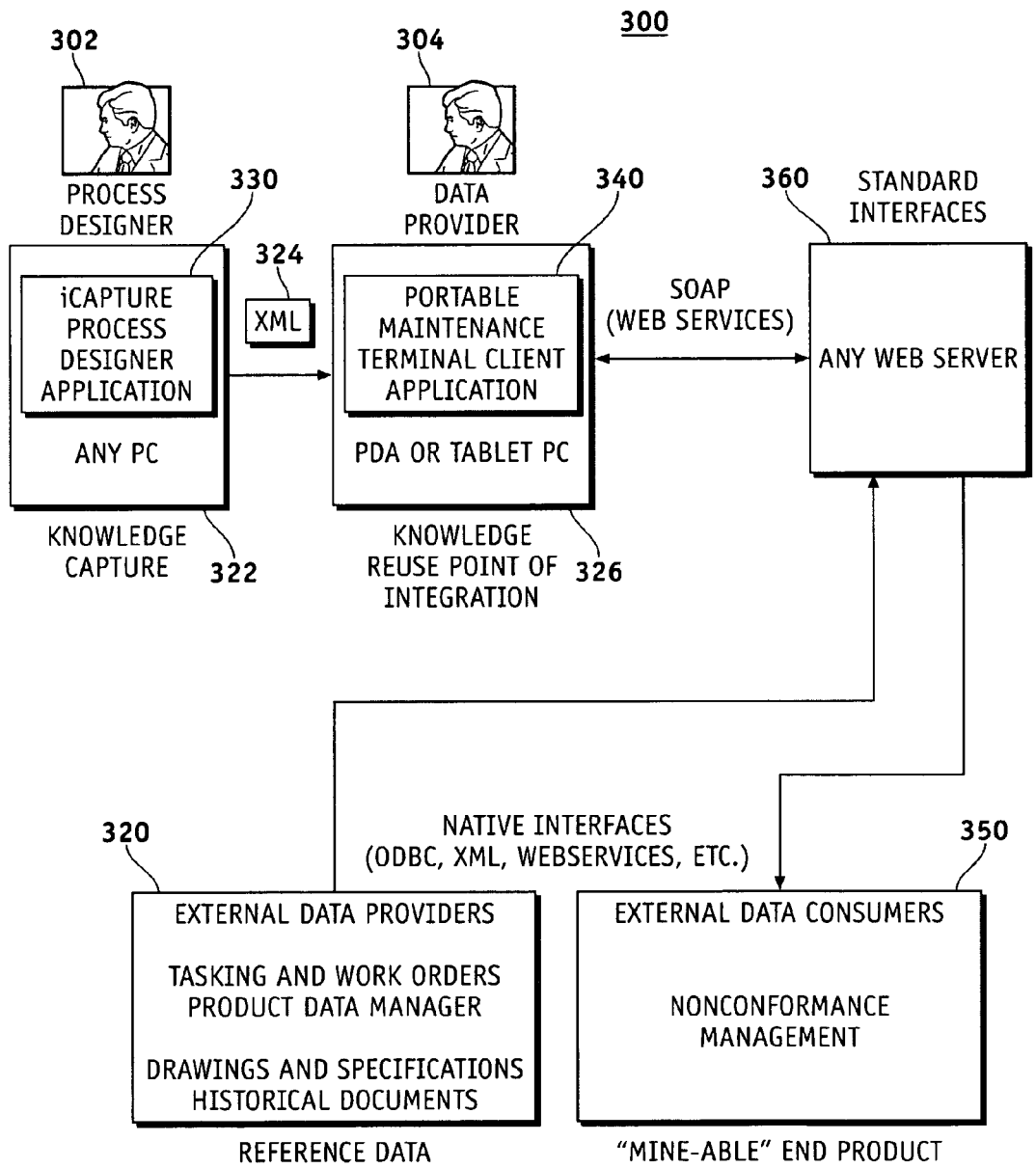
FIG. 3 is a block diagram of a system for capturing data relating to aircraft nonconformance documentation.

FIG. 3 is a block diagram of a system 300 for capturing data relating to aircraft nonconformance documentation.

The system 300 comprises at least one data provider 304, external data providers (EDPs) 320, a computer 326 including a portable maintenance terminal (PMT) module 340, a computer 322 including Process Designer 302 (PD) module 330, external data consumers (EDCs) 350 and a web server 360 which provides an interface between the PMT module 340, the EDPs 320 and the EDCs 350.

A process designer, such as a subject matter expert, can use the PD module 330 to create capture templates based on his/her knowledge of the data requirements of a given context or scenario. The PD module 330 includes modules for building an XML capture template schema (XSD) that defines questions that can be asked to a data provider 304. The capture template 324 will conform to this XML capture template schema (XSD). A graphical representation of one implementation of the XML capture template schema (XSD) is shown in FIGS. 2A-2F. In the implementation shown in FIGS. 2A-2E, the XML capture template schema (XSD) comprises steps 210, verbiage 220 and metadata applicability 230. The steps are questions to be asked to the data provider 304 identifying the nonconformance. The verbiage comprises text used to provide a textual representation of the answers or responses provided by the data provider 304.

One step is a "user prompt" which is typically an instruction telling the data provider 304 what information is required, and another step is an "input type." The input types can include, for example, any of the following:

INKEDIT—the data provider 304 will write his/her response using handwriting recognition CHECKEDLIST—the data provider 304 will select from a list of available options INKPICTURE—the data provider 304 will attach and optionally annotate a graphic image APPROVAL—the data provider 304 will approve some operation using a supported approval method (which could be scanning his/her employee badge, providing a biometric sample, or entering a password)

In addition to these simple input types, the process designer 302 of the capture template may use simple logic and flow control operations which include:

IF Statement—the process designer 302 can specify questions to ask if a certain logical comparison (also provided by the process designer 302) evaluates to true LOOP Statement—the process designer 302 can specify a set of questions to ask a certain number of times. The number of "loops" can be specified either by a hard-coded value or can be controlled by an earlier response.

SET Statement—the process designer 302 can specify a value directly within the capture template that can be used later to control some aspect of the templates flow or output.

The XML capture template schema (XSD) also supports the association of one or more web services with each of those data capture steps which can be used to integrate external data sources within the process. For example, if the process designer 302 wanted to ask the data provider 304 to provide the part number of the defective part, the process designer 302 could specify the URL of a web service that would return a list of valid part numbers for the data provider 304 to select from. This helps eliminate typographical errors and speed the data entry process.

Once XML capture template schema (XSD) for describing a data capture process is provided, a process designer 302 can model a process using an XML or text editor. However, given that a process designer 302 may not be familiar or comfortable with the XML markup language, an application called the Process Designer 302 (PD) module 330 is provided which allows a process designer 302 to build XML-based capture templates 324 (conforming to the XML capture template schema) using a graphical user interface (GUI). It should be appreciated that although the capture templates 324 are described as XML-based, the capture templates can be represented, for instance, as other types of markup language documents conforming to the schema for a capture template.

Figure 4:
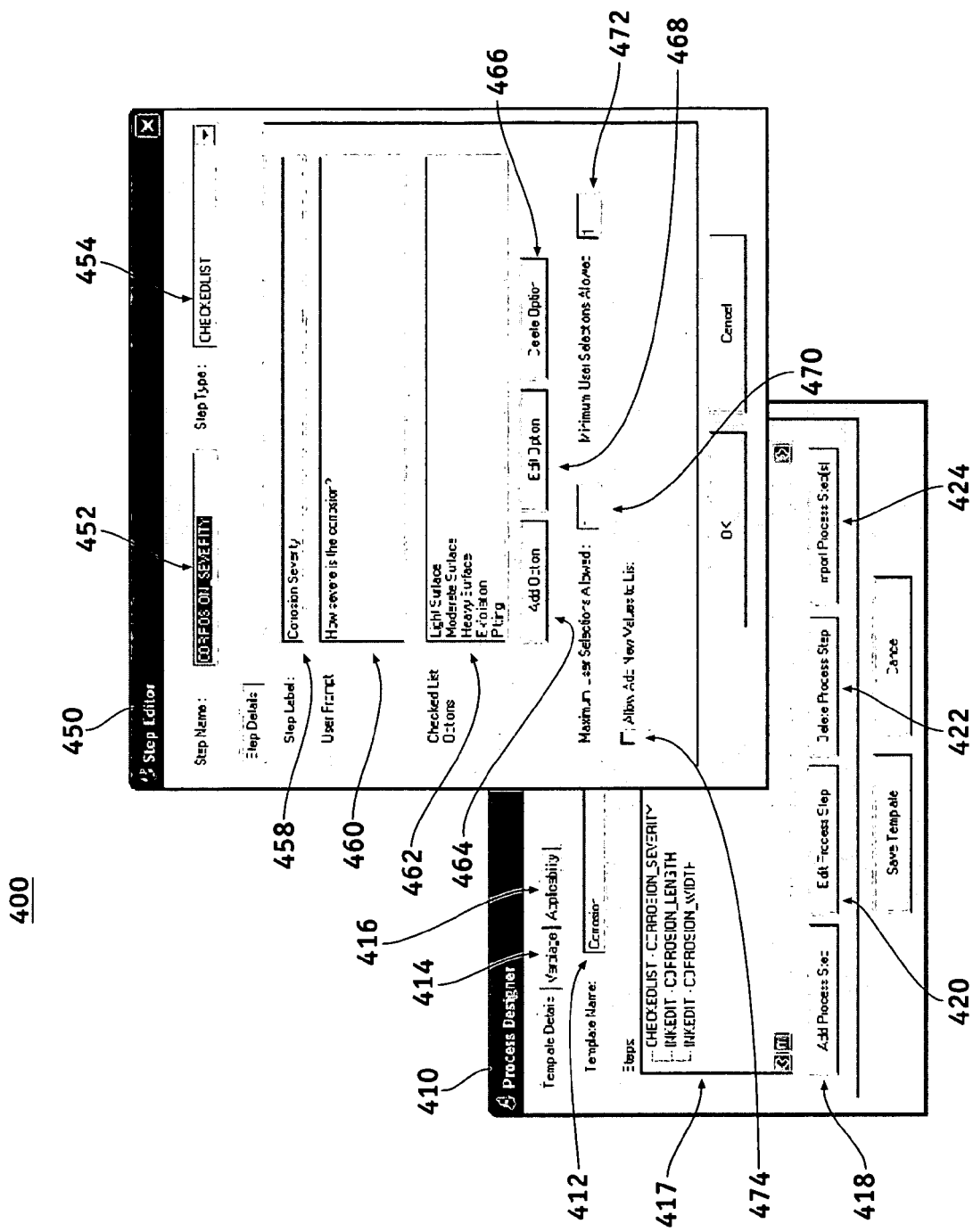
FIG. 4 shows screen shots of a graphical user interface (GUI) for a process designer module used to create a capture template, and a GUI for a step editor sub-module used to create a steps portion of the capture template.

FIG. 4 shows screen shots 400 of a graphical user interface (GUI) 410 for a process designer module 330 used to create a capture template 324, and a GUI 450 for a step editor sub-module 450 used to create the steps portion of the capture template 324.

The GUI 410 for the process designer 302 module 330 includes a prompt for the template name 412, a template details tab for creating steps of the capture template, a verbiage tab 414, and an applicability tab 416. The GUI 410 also includes a number of buttons 418-424 for adding 418, editing 420, deleting 422 or importing 424 process steps in the capture template. The particular steps displayed in this example include CHECKEDLIST—CORROSION_SEVERITY, INKEDIT—CORROSION_LENGTH, AND INKEDIT-CORROSION_WIDTH which are used to create a step in the capture template for "corrosion" which asks for inputs including severity, length, and width of corrosion defect, respectively.

The GUI 450 for the step editor sub-module 450 includes a box for step name 452, a box for step type 454, a tab for step details 456, a box for step label 458, a box for user prompt 460, a box for checked list options 462, buttons 464-468 for adding 464, editing 466 and deleting 468 options, a box for indicating the maximum number of user selections allowed 470, a box for indicating the minimum number of user selections allowed 472, and a check box for allowing new values to be added to the list 474. Each step is given a name, which is treated as a "variable name" by which the eventual response to that step can be referenced. In this particular example, the step name 452 and step label 457 are for Corrosion Severity, the step type 454 is for CHECKEDLIST, the user prompt asks "How severe is the corrosion?", the checked list options 462 are Light Surface, Moderate Surface, Heavy Surface, Exfoliation and Pitting, the maximum number of user selections allowed 470 is 1, and the minimum number of user selections allowed 472 is 1.

FIG. 5 is an example of the XML schema (XSD) generated by the questions in FIG. 4.

The XML-based capture templates 324 generated by, the PD module 330 are transferred to the PMT module 340 which asks the questions (specified by the template) to the information provider that is operating the PMT application.

The web server or servers 360 serve as "inbound" interfaces to "reference data" (block 320) which are pieces of information referenced by the capture template 324 itself (block 324) to provide assistance to the user 304 in the data collection process. The web servers 360 also serve as an "outbound" interface for data from the PMT module 340 to EDCs 350 in the IT infrastructure. For example, if the capture template 324 is used to generate a nonconformance document at the PMT module 340, the structured data (blocks 142 and/or 144) can be uploaded to the nonconformance management system (block 150/350).

Figures 6, 7:
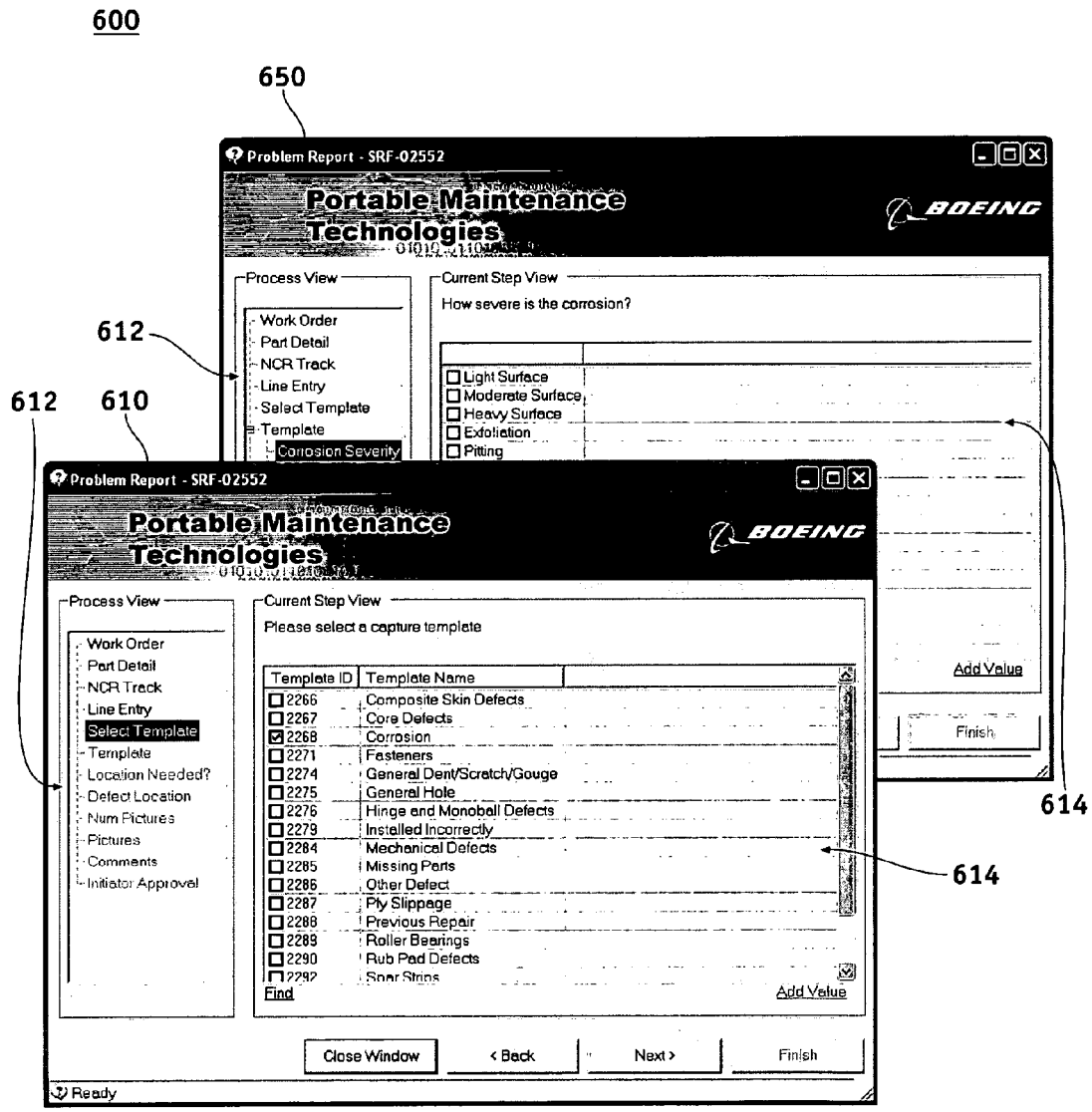
FIG. 6 shows screen shots of a graphical user interface (GUI) of a portable maintenance terminal for displaying the questions from the capture template created in FIG. 4.
FIG. 7 is an example of an XML document containing responses of a data provider to the questions presented in FIG. 6 and conforming to schema in FIG. 5.

FIG. 6 shows screen shots 600 of a graphical user interface (GUI) of a portable maintenance terminal 340 for displaying the questions from the capture template 324 created in FIG. 4. In this standardized nonconformance reporting process, the data provider 304 responsible for identifying the nonconformance will carry a handheld computer 326. The computer 326 of FIG. 3 runs a portable maintenance terminal (PMT) application 340 which presents the questions specified by the capture template to the data provider 304. In particular, the PMT application 340 interprets the capture template 324 for corrosion defects, and present a series of defect specific questions to the data provider 304 via a GUI displayed on the handheld computer 326. In this particular implementation, the PMT client 326 presents the questions from the capture template 324 to the data provider 304 utilizing a "wizard-style" step-by-step interface. It should be appreciated that the specific capture template varies based on the type of nonconformance identified.

The GUIs 610, 650 display a process view listing 612 and a current step view listing 612. The GUI 610 can include a "wizard-style" user interface that includes a process view 612 which are the "step names" 242C for the individual steps in the capture template, a current step view 614 which is the data input specified by the current simple step 242, as well as navigation buttons on the bottom to go to the next or previous step.

FIG. 7 is an example of an XML document 700 containing responses of a data provider 304 to the questions presented in FIG. 6 and conforming to schema in FIG. 5. Once the capture template is presented to the data provider 304, his or her responses will be saved into an XML document matching the schema from FIG. 5. In the background, the defined steps and their names are translated into an XML capture template schema (XSD) defining a XML document with contents which are the responses of the data provider 304 answering the questions.

Because each XML representation of responses from various data providers 304 will conform to the same schema, this can allow the EDCs 350 to easily analyze the data collected form the various data providers 304. For example, it then becomes a trivial task for an EDC 350 to answer questions, such as: What is the number of "Light Surface" corrosion defects? What are the minimum and maximum areas of corrosion instances? What is the average area of corrosion instances? By contrast, if the problems were documented by hand it would require either a manual review by a person, or some sort of text parsing heuristic (error prone) to determine the answers to these simple questions. Obviously as more complex information about the nature and location of defects is added to the capture template, increasingly useful analysis can be performed on the results. Another possibility is that defects can automatically be dispositioned (e.g., repair determined) if the defects fall within certain ranges or tolerances.

While the XML representation is excellent for computer analysis, it is also desirable to provide a human readable form of the document for use by other people who may be required to act on the data (such as the mechanic fixing the problem, a customer, etc.).

To support this requirement, the eXtensible Stylesheet Language (XSL) can be used to process and alter an XML document into another form (such as plain text, HyperText Markup Language (HTML), or XML conforming to a different schema). To avoid the significant training needed to learning to author XSL, the PD module 330 also includes "verbiage editor" functionality that allow the process designer 302 to specify how standard text and the responses of the data provider 304 should be combined into a final, human readable form. The verbiage is the textual representation of the answers provided by the data provider 304, and forms the basis of the final nonconformance document.

FIG. 8 shows a screen shot 600 of a graphical user interface (GUI) of verbiage editing. The verbiage editor allows selected user responses to be integrated or combined with standard text to generate an output. The process designer 302 of the capture template can select from the available question responses, and select the questions from a context menu.

FIG. 9 is an XSL representation 900 of the verbiage specified in FIG. 8 and generated by a "verbiage editor" sub-module XXX of the PD module application 330. The "verbiage editor" sub-module automatically converts the verbiage from FIG. 8 into the XSL document 900. An XSL transformation (XSLT) can then be executed based on the data provider's 304 responses (saved as an XML document in FIG. 7) and the XSL for the capture template (in FIG. 9). The result of the XSL transformation would appear as:

The part has Light Surface corrosion, 5 inches long by 2 inches wide.

As a result, both a machine readable (XML) representation of the document (e.g., raw structured data) and a human readable representation of the document (e.g., structured XSL text) are provided.

Thus, it can be appreciated that implementing a standardized nonconformance documentation process can lead to greater efficiencies in several ways. For instance, the nonconformance reporting process cycle time is lowered because a standard process is followed. Moreover, if the mechanics documenting the defects, the planners determining the fixes for the defects, and the estimators determining the cost of the repairs can agree upon a standard documentation format then the planning and estimating portions of the repair can be automated in many circumstances. In addition, training costs are drastically lowered for employees moving from one program to another since there is no need to learn a new reporting process. Such enterprise-wide standard nonconformance reporting processes can also facilitate the development of enterprise-wide nonconformance analysis tools. This can eliminate duplication of effort among different programs since each program can develop and maintain tools to analyze its nonconformance data.

Figure 10:
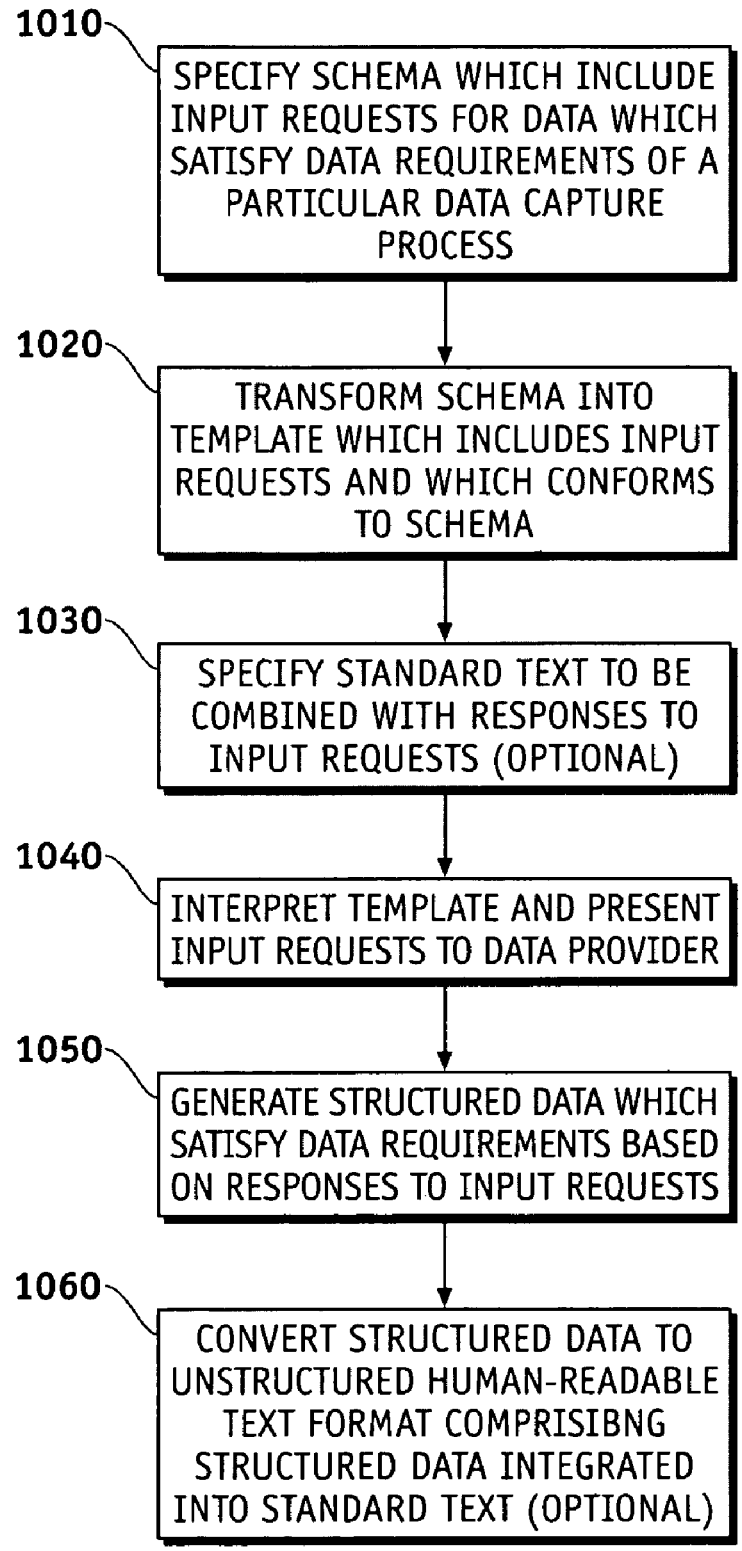
FIG. 10 is a flow chart showing techniques for use in an information collection process according to an exemplary embodiment.

FIG. 10 is a flow chart showing techniques for use in an information collection process according to an exemplary embodiment. These techniques can be used to capture data which satisfy data requirements of a particular data capture process.

At step 1010, schema are specified which include input requests for the data which satisfy the data requirements of the particular data capture process are specified. The input requests may comprise, for example, questions to be presented to a data provider who is tasked with collecting the data which satisfy data requirements of a particular data capture process. In one embodiment, the schema can be specified by specifying a step for each input request, and translating the steps into the schema. Each step comprises a variable name by which a response to that step is referenced.

At step 1020, the schema can then be transformed into a template which includes the input requests and which conforms to the schema. In one exemplary implementation, the schema comprise XML schema. In this case, the XML schema can be transformed into an XML-based template conforming to the XML schema.

At step 1030, standard text to be combined with the responses to the input requests can optionally be specified.

At step 1040, the template can then be interpreted, and the input requests can be presented to a data provider. In one exemplary implementation, At step 1050, structured data which satisfy the data requirements of the particular data capture process can then be generated based on responses to the input requests. In one embodiment, the input requests comprise questions and the responses comprise responses to the questions. In one implementation, an XML document which comprises the structured data can be generated based on the responses to the questions. The XML document can be generated, for example, by saving the responses to the questions in the XML document as structured XML data which satisfy the data requirements of the particular data capture process and which conform to the XML schema. In addition, external data obtained from an external data provider can be integrated within at least one of the steps to help satisfy the data requirements of the particular data capture process.

At step 1060, The XML document can be converted to an unstructured human-readable text format. For example, an eXtensible Stylesheet Language Transformation (XSLT) can be performed on the XML document to generate an XSL document comprising the structured XML data integrated into the standard text.

As will now be described with reference to FIG. 11, these techniques can implemented as part of a system for capturing data.

Figure 11:
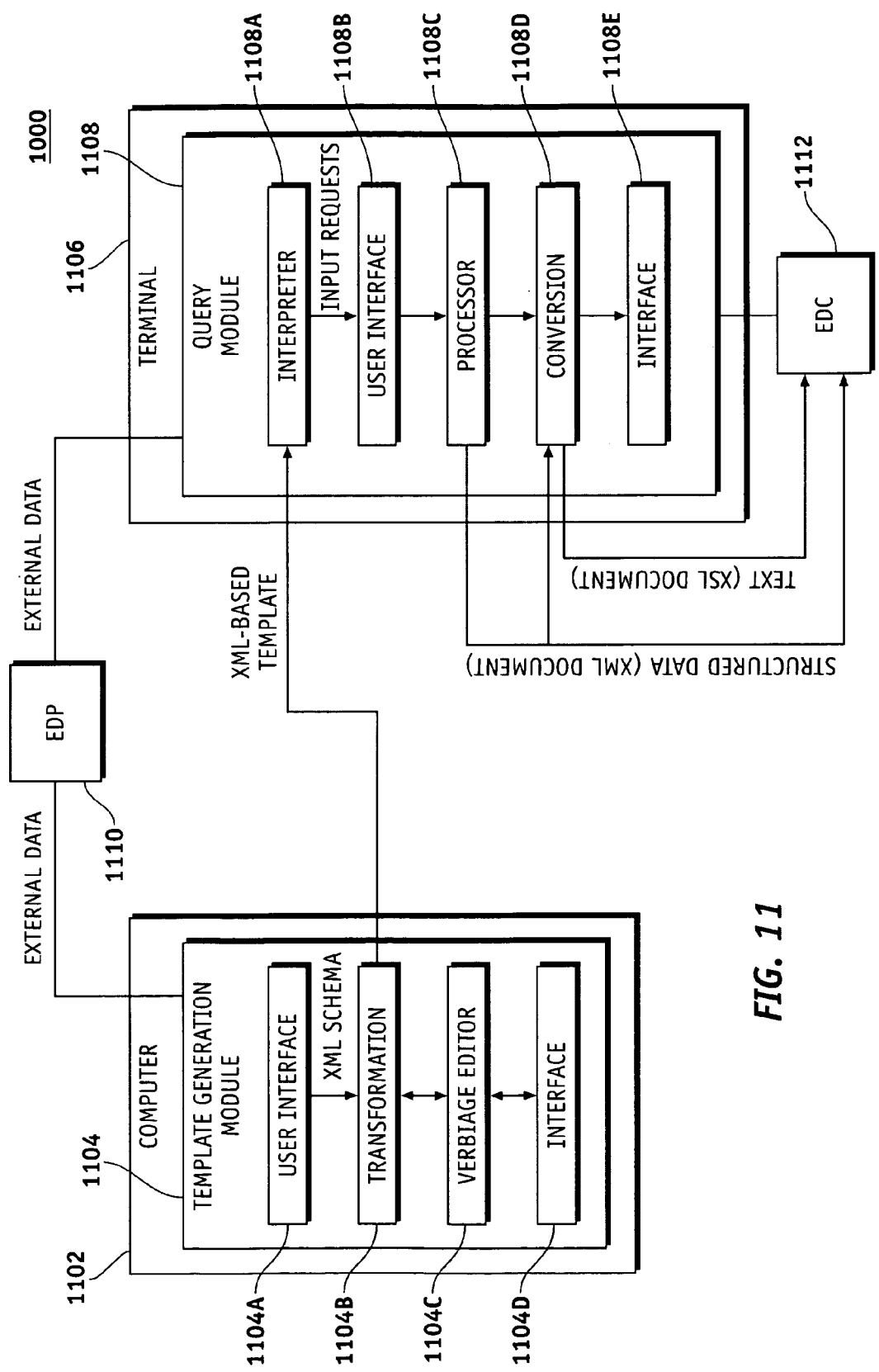
FIG. 11 is a system for capturing data which satisfy data requirements of a particular data capture process according to an exemplary embodiment.

FIG. 11 is a system 1100 for capturing data which satisfy data requirements of a particular data capture process according to an exemplary embodiment. The system 1100 comprises a computer 1102 implementing a template generation module 1104, a terminal 1106 implementing a query module 1108 in communication with the template generation module 1104, an external data provider 1110 and an external data consumer (EDC) 1112.

The template generation module 1104 can include, for example, a user interface 1104A, a transformation sub-module 1104B, a verbiage editor sub-module 1104C for specifying standard text, and an interface 1104D for communicating with the external data provider.

The user interface 1104A is used to specify XML schema comprising input requests (e.g., questions) for the data which satisfy the data requirements of the particular data capture process. For example, a process designer can specify a step for each input request, and the template generator module can translate the steps into the XML schema. Each step comprises a variable name by which a response to that step is referenced.

The transformation sub-module 1104B transforms the XML schema into an XML-based template conforming to the XML schema. The XML-based template comprises the input requests (e.g., questions).

The interface 1104D for communicating with the external data provider can allow external data from at least one web service to be integrated into or within at least one of the steps to help satisfy the data requirements of the particular data capture process.

The query module 1108 can include, for example, an interpreter sub-module 1108A, a user interface 1108B, a processor sub-module 11108C, a conversion sub-module 1108D, and an interface 1108E for communicating with the external data provider.

The interpreter sub-module 1108A interprets the XML-based template received from the XML-based template generation module, and the user interface 1108B presents the input requests (e.g., questions) for the data which satisfy the data requirements of the particular data capture process.

The processor sub-module 1108C generates structured data based on the responses to the input requests (e.g., questions) specified by the XML-based template. The structured data satisfy the data requirements of the particular data capture process. For example, the processor sub-module can generate an XML document, based on the responses to the questions, which comprises the structured data. In one implementation, the processor sub-module comprises an XML engine that saves the responses to the questions in the XML document as structured XML data which satisfy the data requirements of the particular data capture process and which conform to the XML schema.

The conversion sub-module 1108D configured to convert the XML document to an unstructured human-readable text format. In one implementation, the conversion sub-module 1108D comprises an eXtensible Stylesheet Language (XSL) conversion sub-module configured to perform an eXtensible Stylesheet Language Transformation (XSLT) on the XML document to generate an XSL document comprising the structured XML data integrated into the standard text.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. For example, although the above description refers to the use of XML as a persistent data storage format for capture templates, it should be appreciated that other Standard Generalized Markup Languages (SGML) for creating a document structure could be utilized, such as, HTML, Microsoft's Channel Definition Format (CDF), or ChartWare, to implement certain portions of the disclosed embodiments. Similarly, although the above description refers to the use of XSD to define the valid attributes for a capture template, or the valid responses to a capture template, it should be appreciated that other XML schema languages, such as document type definition (DTD) or Simple Object XML (SOX), could be used to implement certain portions of the disclosed embodiments. In addition, although the above description refers to the use of XSL to convert structured data into human readable text or structured data of another format, it should be appreciated that other standard style sheet languages, such as the Document Style Semantics and Specification Language (DSSSL) and the Cascading Style Sheet, level 1 (CSS1), could be used to implement certain portions of the disclosed embodiments.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A computer-implemented method for standardizing a reporting of defects in an aircraft support and service environment, the method comprising:

displaying a graphical user interface on a display screen of a portable terminal connected to the Internet and to a plurality of external data providers and a plurality of external data consumers, the graphical user interface having a process view and a current step view;

determining a location of a data provider using a geographical positioning system;

using a sensor to capture a real time status of a part on an aircraft;

responsive to the data provider inspecting the part, identifying a defect, and selecting, at the current step view, a template corresponding to the defect, displaying a plurality of questions configured to prompt the data provider to write a plurality of responses to the plurality of questions on the graphical user interface, the response to be interpreted by the portable terminal using a handwriting recognition function, wherein the plurality of responses are a plurality of variable entries, each response to a variable entry corresponding to a standard text regarding the defect;

responsive to receipt of the plurality of responses to the plurality of questions from handwriting recognition function, combining the plurality of responses with one or more of a plurality of standard texts selected to form a plurality of structured data;

capturing, by the data provider at the portable terminal, an image of the defect, inputting the image into the portable terminal, and annotating the image in the portable terminal using the handwriting recognition function to form an annotated image;

converting, at the portable terminal, the structured data into an aircraft nonconformance report comprising the annotated image and a representation of a document containing both a human readable output and a machine readable representation of the document, wherein the reporting of quality defects in the aircraft nonconformance report in the aircraft support and service environment is standardized.

2. The computer-implemented method of claim 1, wherein the sensor is an oscilloscope.

3. The computer-implemented method of claim 1, further comprising:

approving an action, by the data provider, at the portable terminal by scanning an employee badge of the data provider.

4. The computer-implemented method of claim 1, further comprising:

approving an action, at the portable terminal, by an entry of a biometric sample by the data provider.

5. A data processing system comprising:

a processor;

a bus connected to the processor;

a memory connected to the bus, wherein the memory stores a plurality of instructions that, when executed by the processor, performs actions for presenting a plurality of questions on a portable terminal in order to create a corrosion defect map for an aircraft support and service environment, the actions comprising:

connecting the portable terminal to the Internet and to a plurality of external data providers and a plurality of external data consumers;

displaying a graphical user interface on a display screen of the portable terminal;

responsive to a data provider inspecting a part on an aircraft, identifying a corrosion defect, and selecting, at the current step view, a template corresponding to the corrosion defect, displaying a list of corrosion severity descriptive terms including light surface, moderate surface, heavy surface, exfoliation and pitting;

responsive to a selection by the data provider of one of the plurality of corrosion severity descriptive terms, displaying a plurality of questions configured to determine a length and a width of the corrosion, wherein the plurality of questions are configured to prompt the data provider to write the length and the width on the graphical user interface, the length and the width to be interpreted by the portable terminal using a handwriting recognition function;

responsive to receipt of the length and the width from the portable terminal, combining the length and the width with a text selected to form a statement regarding the severity, the length and the width of the corrosion; and capturing, by the data provider at the portable terminal, an image of the corrosion, inputting the image into the portable terminal, annotating the image in the portable terminal using the handwriting recognition function to form an annotated image; and converting the structured data into an aircraft nonconformance report comprising a representation of a document containing both a human readable output and a machine readable representation of the document and including the annotated image configured.

6. The data processing system of claim 5, further comprising:

approving an action, by the data provider, at the portable terminal by scanning an employee badge of the data provider.

7. The data processing system of claim 5, further comprising:

using an oscilliscope to capture a real time status of the part, the part being an aileron.

* * * * *